United States Patent
Flick

(10) Patent No.: US 6,827,642 B2
(45) Date of Patent: Dec. 7, 2004

(54) VEHICLE REMOTE CONTROL AND AIR TREATMENT SYSTEM AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 79 days.

(21) Appl. No.: 10/294,187

(22) Filed: Nov. 14, 2002

(65) Prior Publication Data

US 2004/0094344 A1 May 20, 2004

(51) Int. Cl.$^7$ .................................................. B60H 3/06
(52) U.S. Cl. .......................... 454/156; 62/264; 361/231
(58) Field of Search ........................... 454/75, 156, 158; 361/230, 231; 62/78, 264

(56) References Cited

U.S. PATENT DOCUMENTS

| | | | | |
|---|---|---|---|---|
| 4,038,583 A | * | 7/1977 | Breton | 361/230 |
| 4,789,801 A | | 12/1988 | Lee | 310/308 |
| 5,010,869 A | | 4/1991 | Lee | 123/539 |
| 6,004,382 A | | 12/1999 | Pikesh et al. | 95/270 |
| 6,163,098 A | | 12/2000 | Taylor et al. | 310/308 |
| 6,176,977 B1 | | 1/2001 | Taylor et al. | 204/176 |
| RE37,150 E | | 5/2001 | Anonychuk | 55/385.3 |
| 6,346,877 B1 | | 2/2002 | Flick | 340/426 |
| 6,375,714 B1 | | 4/2002 | Rump et al. | 95/3 |
| 2004/0007000 A1 | * | 1/2004 | Takeda et al. | 62/78 |

FOREIGN PATENT DOCUMENTS

WO    WO 02/11859    2/2002 ........... B01D/46/00

OTHER PUBLICATIONS

Cal Sun Electronics Technology, 2001, The Auto Air Ionizer™, Model No.'s SEYB– 101, 102 and 103 available at www.calsuntech.com.
MGT Online SDN BHD, 1998–2002, MGT Automobile & Car Ionizer product, various models, available at www.mgt.com.my/automobileionizer.
Comtech Research, 2002, High–Output Negative Ionizer for 12 V DC Mobile Use, available at www.negativeiongenerators.com/12negativeiongenerator.html.
Sinus Survival Products, Inc., 1999, Owners Manual for Air Vitalizer™.
IQAir, IQAir Cleanroom Series, available at www.iqair.com/ENG/products/Cleanroom.html.
The Sharper Image, 2002, Ionic Dashboard Ionizer, available at www.sharperimage.com.
Electrocorp, 2002, Ion Air Care brochure, available at www.electrocorp.net.

* cited by examiner

*Primary Examiner*—Harold Joyce
(74) *Attorney, Agent, or Firm*—Allen, Dyer, Doppelt, Milbrath & Gilchrist, P.A.

(57) ABSTRACT

A vehicle remote control and air treatment system includes a selectively operable air treatment device. The air treatment device may be an electrically powered ion generator for selectively generating ions in the vehicle, for example. The vehicle remote control and air treatment device may also include at least one remote transmitter, a receiver at the vehicle for receiving signals from the at least one remote transmitter, and a controller at the vehicle. The controller may be connected to the receiver for performing at least one vehicle function based upon signals from the remote transmitter, and may also selectively operate the air treatment device.

42 Claims, 6 Drawing Sheets

VEHICLE REMOTE CONTROL AND AIR TREATMENT SYSTEM AND ASSOCIATED METHODS

FIELD OF THE INVENTION

The present invention relates to the field of control systems and, more particularly, to vehicle control systems and associated methods.

BACKGROUND OF THE INVENTION

Vehicle security systems are widely used to deter vehicle theft and perform various security-related vehicle functions. A typical vehicle security system includes a controller having a receiver connected thereto. The controller may perform security-related functions, such as locking/unlocking doors, or switching between armed and disarmed modes responsive to signals received from one or more remote transmitters.

Vehicle remote control systems are also widely used to perform vehicle functions. Some of these functions may include locking/unlocking doors, remote engine starting, or trunk release, for example. Still other vehicles are equipped with remote keyless entry (RKE) controllers to permit a user to remotely lock and unlock the vehicle doors using a handheld transmitter. A particularly advantageous security system is disclosed in U.S. Pat. No. 6,346,877, assigned to the assignee of the present invention. A window unit, spaced from the controller, carries the receiver, antenna, and control switches/indicators. Better range and enhanced user convenience are provided.

Ion generators are generally used to eliminate a portion of pollutants in a surrounding area. More specifically, ion generators generate and emit negative ions which collide with airborne particles to provide them with a negative charge. The negatively charged airborne particles accumulate over time until the particles are heavy enough to fall to the ground. This process is advantageous in removing pollutants from the air.

An ion generator for use in a vehicle is offered by The Sharper Image® as the "Ionic Dashboard Ionizer" under model number SI629BLK. This ion generator includes a cigarette lighter adapter to provide power, and generates ions within the vehicle compartment. This type of ion generator may be disadvantageous, however, as it must be manually removed from the cigarette lighter to be turned off. In some vehicles, if the ion generator is left plugged into the cigarette lighter, it may drain the vehicle battery when the vehicle is not running.

Other such ion generators that are powered using a cigarette lighter adapter include those offered by Electrocorp™ under model no. IG-2000, MGT™ under model no. CAI-991, and Comtech™ under model no. IG-1202. These ion generators also suffer from same disadvantages of the ion generator offered by The Sharper Image® in that they must be manually removed from the cigarette lighter so as not to drain the vehicle battery.

SUMMARY OF THE INVENTION

In view of the foregoing background, it is therefore an object of the present invention to provide a selectively operable air treatment device, such as a vehicle ion generator, for example.

This and other objects, features, and advantages of the present invention are provided by a vehicle remote control and air treatment system that may include an air treatment device to treat air in the vehicle. The air treatment device may comprise an electrically powered ion generator for selectively generating ions in the vehicle. The system may further include at least one remote transmitter, a receiver at the vehicle for receiving signals from the remote transmitter, and a controller at the vehicle. In some embodiments, the controller may be connected to the receiver for performing at least one vehicle function based upon signals from the remote transmitter, and may also selectively operate the electrically powered ion generator.

The controller may comprise a security controller that may be switchable to different modes and may operate the electrically powered ion generator based upon the mode. More specifically, the security controller may be switchable between armed and disarmed modes, and may turn the electrically powered ion generator on when in the disarmed mode, and off when in the armed mode.

The electrically powered ion generator may comprise a power supply for generating a high voltage from a vehicle supply voltage, and an electrode structure connected to the power supply. The electrode structure may comprise a conductive brush, for example. The electrically powered ion generator may further comprise a housing separate from the controller. The housing may carry the power supply, the electrode structure, the receiver, and/or an antenna. A control switch may also be connected to the controller and carried by the housing.

In one embodiment, the controller may comprise a remote keyless entry controller that operates the electrically powered ion generator responsive to a signal to unlock at least one vehicle door. In other embodiments, the controller may comprise a remote engine start controller that operates the electrically powered ion generator responsive to a signal to start an engine of the vehicle.

A manual switch for selectively operating the electrically powered ion generator may also be included. The electrically powered ion generator may further comprise at least one indicator for indicating operation of the electrically powered ion generator.

In other embodiments, the electrically powered ion generator may be carried by a housing separate from the controller. This separate housing may also carry a controller device, such as the receiver, antenna, or a control switch or indicator, for example.

A method aspect of the present invention is for treating air within a vehicle. The method may include providing an electrically powered ion generator in the vehicle, and selectively operating the electrically powered ion generator using a controller at the vehicle that is also for performing at least one vehicle function based upon signals from at least one remote transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
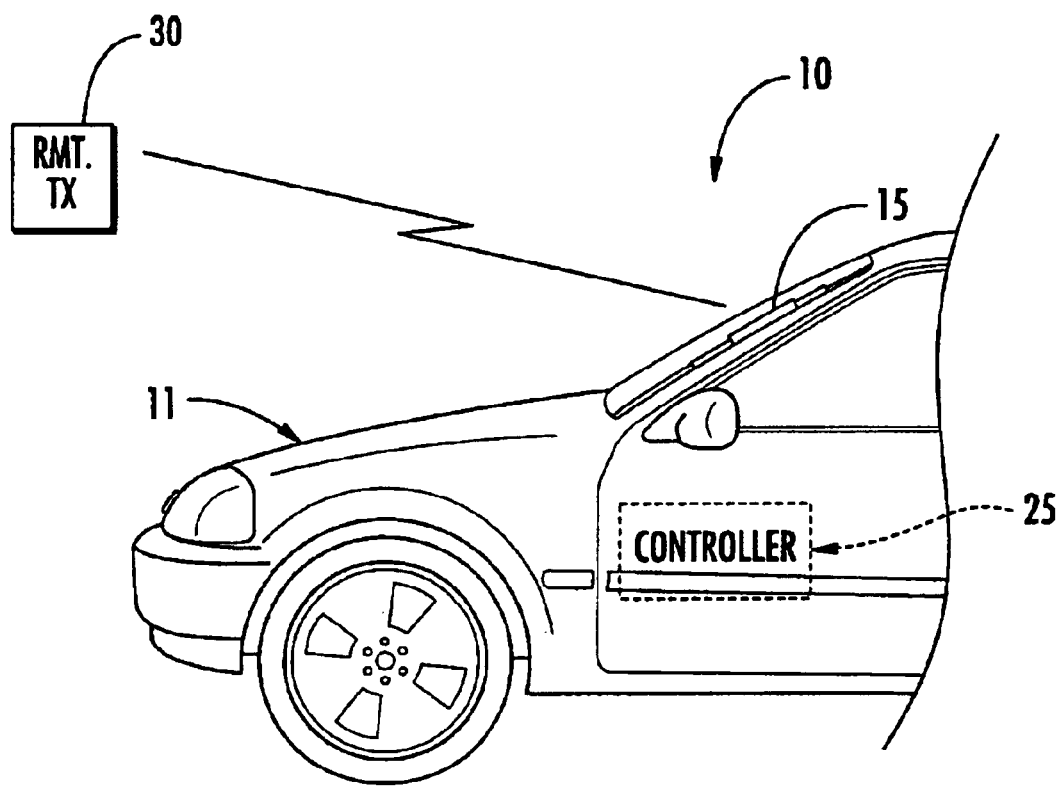
FIG. 1 is schematic diagram of a vehicle remote control and air treatment system according to the present invention.
Figure 2:
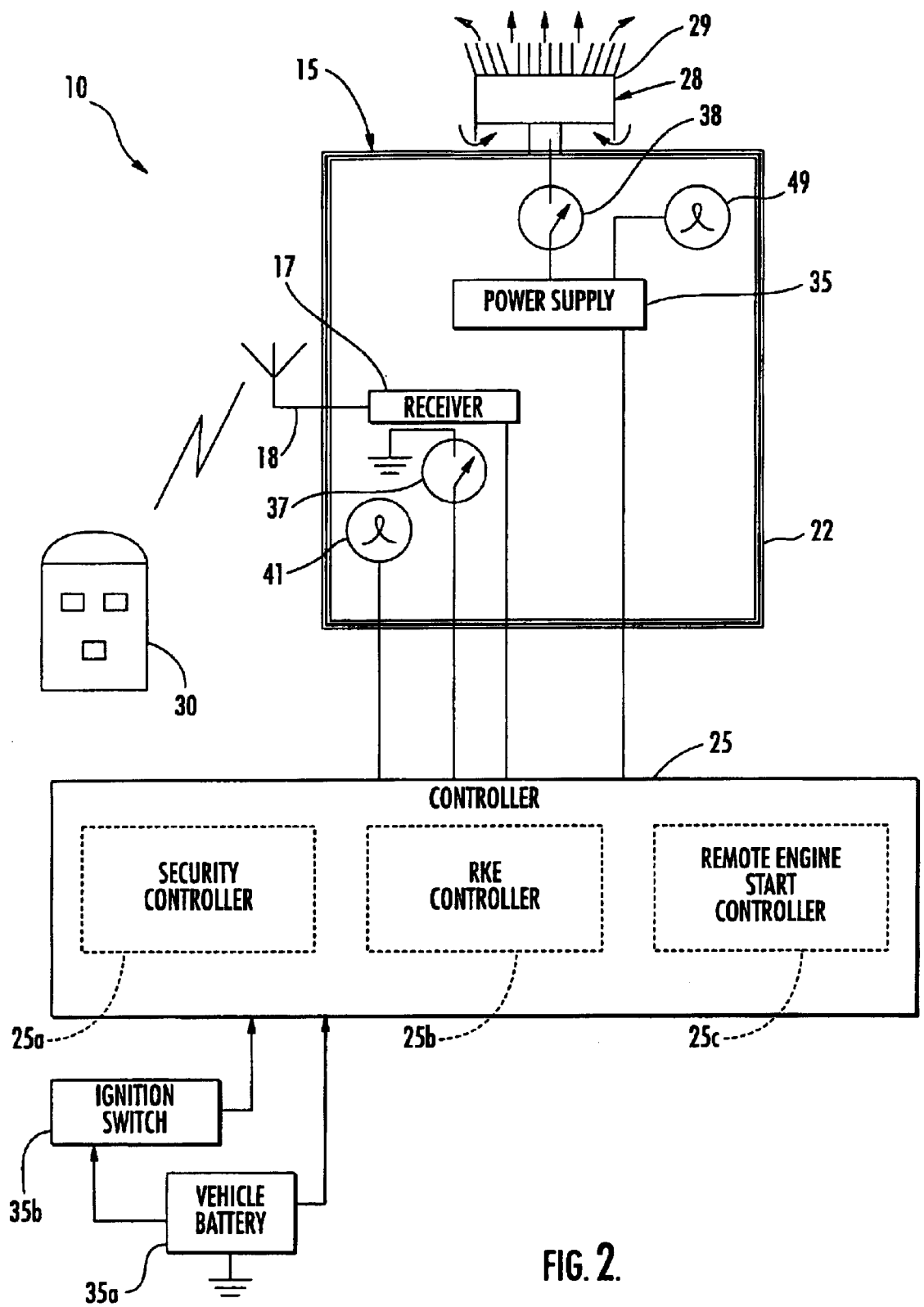
FIG. 2 is a more detailed schematic diagram of the vehicle remote control and air treatment system shown in FIG. 1.

Referring initially to FIGS. 1 and 2, a vehicle remote control and air treatment system 10 is now described. The system 10 illustratively includes an air treatment device for treating air in the vehicle 11. More particularly, the air treatment device may be an electrically powered ion generator for selectively generating ions in the vehicle 11. The system 10 also illustratively includes at least one remote transmitter 30, a receiver 17 at the vehicle 11 for receiving signals from the remote transmitter, and a controller 25 at the vehicle. The remote transmitter 30 is generally carried by a user, but other remote transmitters may also be used, as shall be understood by those skilled in the art.

The controller 25 is illustratively connected to the receiver 17 for performing at least one vehicle function based upon signals from the remote transmitter 30. The controller 25 also selectively operates the electrically powered ion generator 15. The electrically powered ion generator 15 preferably generates ions so that an ion level within the vehicle 11 may be within the range of about 1,000 to 20,000 ions per cubic centimeter, for example. In some embodiments, the controller 25 may be connected to the receiver 17 to selectively operate the electrically powered ion generator 15 based upon signals received from the remote transmitter 30, and without performing any other vehicle functions.

The electrically powered ion generator 15 illustratively includes a power supply 35 for generating a high voltage from a vehicle supply voltage. The vehicle supply voltage may, for example, be constantly supplied from the vehicle battery 35a, or supplied based upon the position of the ignition switch 35b, or any other vehicle supply voltage, as will be understood by those skilled in the art.

An electrode structure 28 is illustratively connected to the power supply 35. The electrode structure 28 comprises a conductive brush 29. More particularly, air from within the vehicle 11 enters the electrically powered ion generator 15 from a lower portion of the conductive brush 29 (as indicated by the lower arrows), and ions are emitted from an upper portion of the conductive brush (as also indicated by the upper arrows).

The electrically powered ion generator 15 also illustratively includes a housing 22 separate from the controller 25. The housing 22 carries the power supply 35 and the electrode structure 28. Although the housing 22 is separate from the controller 25, it will be readily understood by those skilled in the art that the electrically powered ion generator 15 and the controller may be included within the same housing in other embodiments.

The receiver 17 is also illustratively carried by the housing 22. An antenna 18 is connected to the receiver 17 and is also carried by the housing 22. A control switch 37 and an indicator 41 are carried by the housing 22 and connected to the controller 25. The housing 22, switch 37, and indicator 41 may be similar to the corresponding windshield mounted components of the security system disclosed in U.S. Pat. No. 6,346,877 to the present inventor, and the entire contents of which are incorporated herein by reference.

The system 10 may further comprise a manual switch 38 carried by the housing 22 for selectively operating the electrically powered ion generator 15. Accordingly, a user may advantageously operate the electrically powered ion generator 15 with or without the use of the remote transmitter 30. An indicator 49 is illustratively connected to the power supply 35 to indicate operation of the electrically powered ion generator 15.

In some embodiments, the system 10 may be a vehicle security and air treatment system. In other words, the controller 25 may comprise a security controller 25a that is switchable to different modes. The security controller 25a selectively operates the electrically powered ion generator 15 based upon one of the modes. More specifically, the security controller 25a is switchable between armed and disarmed modes, and selectively turns the electrically powered ion generator 15 on when in the disarmed mode, and off when in the armed mode.

In another embodiment of the present invention, the controller 25 comprises a remote keyless entry (RKE) controller 25b. The RKE controller 25b operates the electrically powered ion generator 15 responsive to a signal to unlock a vehicle door. The RKE controller 25b may also stop operation of the electrically powered ion generator 15 responsive to a signal to lock a vehicle door.

In yet another embodiment of the present invention, the controller 25 comprises a remote engine start controller 25c. The remote engine start controller 25c may operate the electrically powered ion generator 15 responsive to a signal to start an engine of the vehicle 11. The remote engine start controller 25c may also stop operation of the electrically powered ion generator 15 responsive to the engine of the vehicle 11 being turned off.

Figure 3:
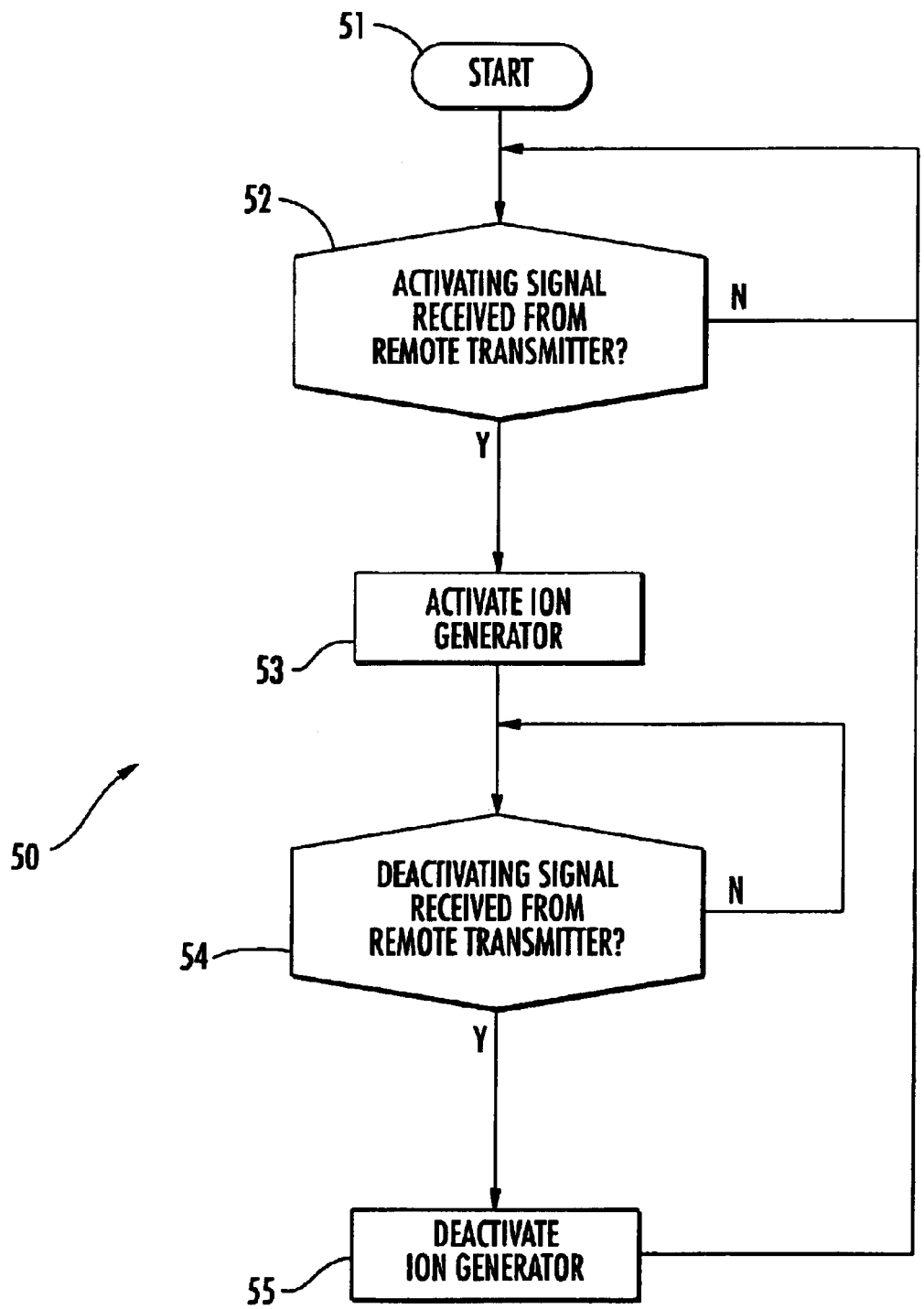
FIG. 3 is a flow chart illustrating operation of a first embodiment of the vehicle remote control and air treatment system shown in FIG. 1.

Turning now additionally to the flow chart 50 of FIG. 3, a method of operating an embodiment of the vehicle remote control and air treatment system 10 is now described. From the start (Block 51), it is determined at Block 52 whether an activating signal has been received from the remote transmitter 30. If, at Block 52, it is determined that an activating signal has been received from the remote transmitter 30, then the electrically powered ion generator 15 is operated at Block 53. If, however, it is determined at Block 52 that the activating signal has not been received from the remote transmitter 30, then the system 10 awaits receipt of the activating signal.

At Block 54, it is determined whether a deactivating signal has been received from the remote transmitter 30. If it is determined that a deactivating signal has been received from the remote transmitter 30, then the electrically powered ion generator 15 is deactivated at Block 55. If, however, it is determined that the deactivating signal has not been received from the remote transmitter 30, then the system 10 awaits a deactivating signal. After the electrically powered ion generator 15 is deactivated at Block 55, the system 10 again awaits an activating signal from the remote transmitter 30 to activate the electrically powered ion generator 15.

Figure 4:
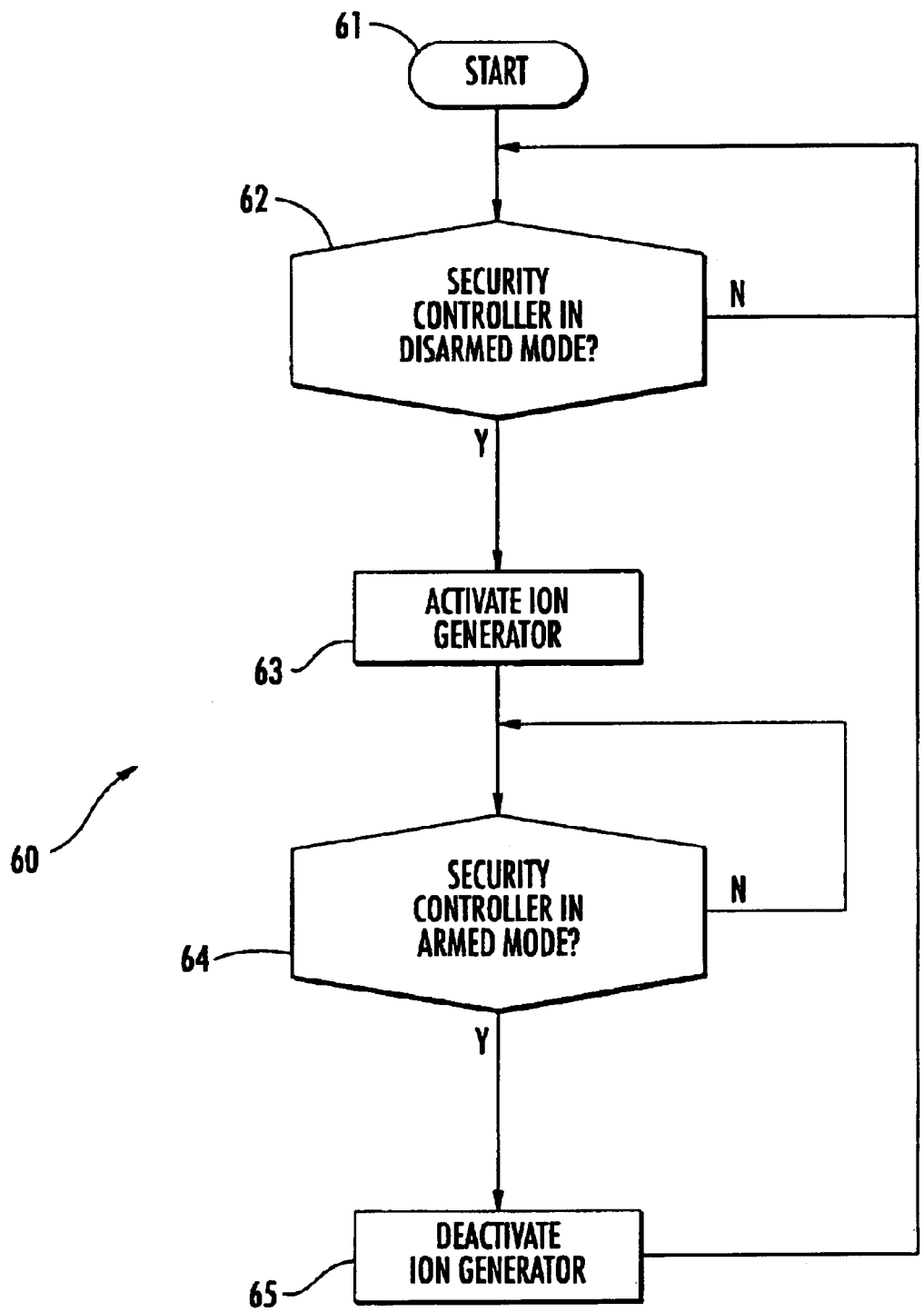
FIGS. 4–6 are flow charts illustrating operation of alternate embodiments of the vehicle remote control and air treatment system shown in FIG. 1.

Turning now additionally to the flow chart 60 of FIG. 4, alternate operation of the vehicle remote control and air treatment system 10 is now described. From the start (Block 61), it is determined at Block 62 whether the security controller 25a is in a disarmed mode. If it is determined at Block 62 that the security controller 25a is in the disarmed mode, then the electrically powered ion generator 15 is activated at Block 63. If, however, it is determined at Block 62 that the security controller 25a is not in the disarmed mode, then the system 10 awaits the security controller to be switched to the disarmed mode.

At Block 64, it is determined whether the security controller 25a has been switched to the armed mode. If it is determined at Block 64 that the security controller 25a has been switched to the disarmed mode, then the electrically powered ion generator 15 is deactivated at Block 65. If, however, it is determined that the security controller 25a has not been switched to the disarmed mode, then the system 10 awaits the security controller to be switched to the disarmed mode. After the electrically powered ion generator 15 is deactivated at Block 65, the system 10 again awaits the security controller 25a to be switched to the disarmed mode. This arrangement coordinates operation of the ion generator 15 with normal control and functioning of the security controller 25a to enhance user convenience, and also while conserving use of the vehicle battery.

Figure 5:
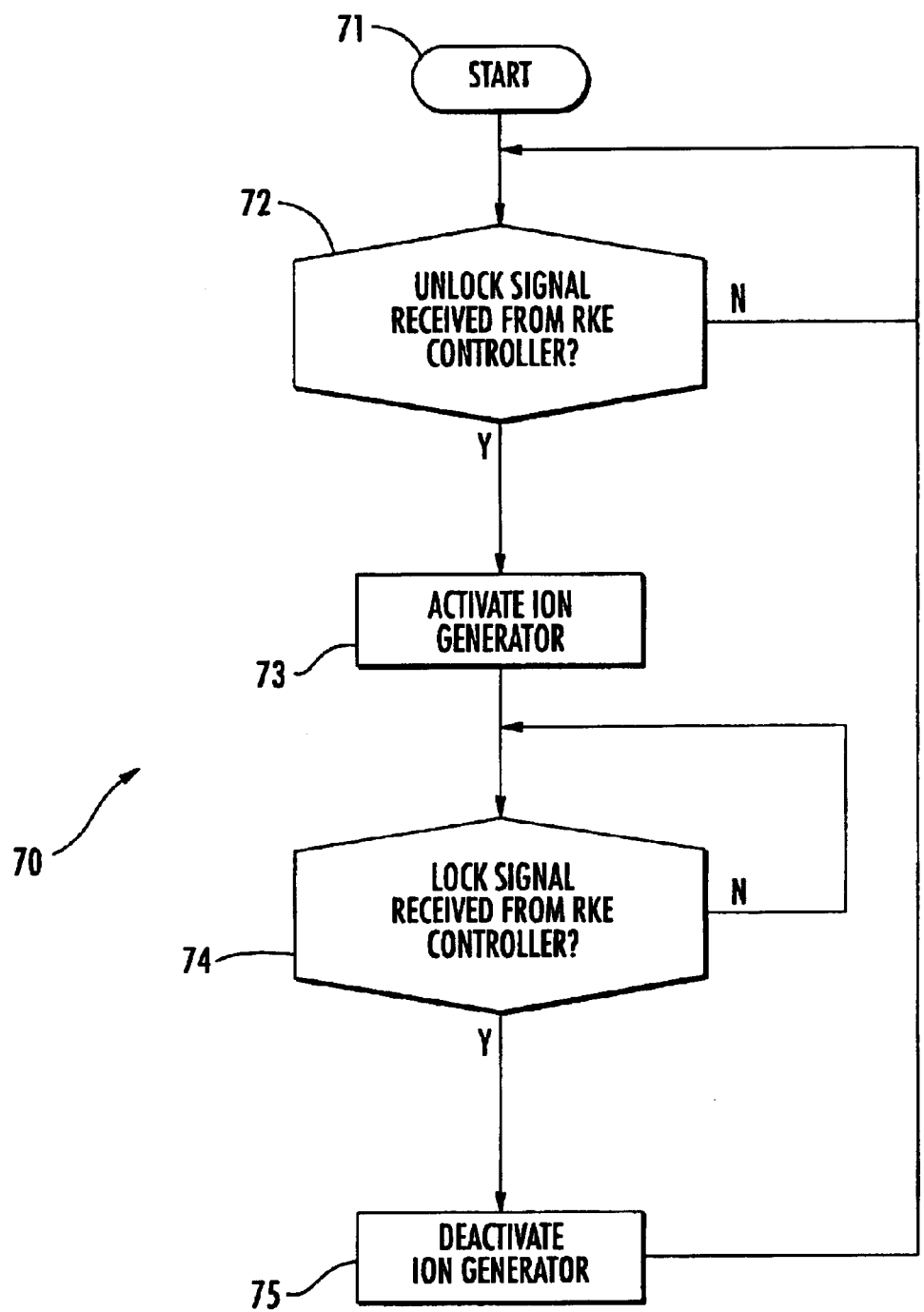

Turning now additionally to the flow chart 70 of FIG. 5, further operation of of the vehicle remote control and air treatment system 10 is now described. From the start (Block 71), it is determined at Block 72 whether an unlock signal has been received from the RKE controller 25b. If it is determined at Block 72 that an unlock signal has been received from the RKE controller 25b, then the electrically powered ion generator 15 is activated at Block 73. If, however, it is determined at Block 72 that an unlock signal has not been received from the RKE controller 25b, then the system 10 awaits receipt of the unlock signal.

At Block 74, it is determined whether a lock signal has been received from the RKE controller 25b. If it is determined that a lock signal has been received the RKE controller 25b, then the electrically powered ion generator 15 is deactivated at Block 75. If, however, it is determined that an unlock signal has not been received from the RKE controller 25b, then the system 10 awaits receipt of the lock signal from the RKE controller 25b. After the electrically powered ion generator 15 is deactivated at Block 75, the system 10 again awaits the unlock signal from the RKE controller 25b. Accordingly, user convenience and battery conservation are also provided.

Figure 6:
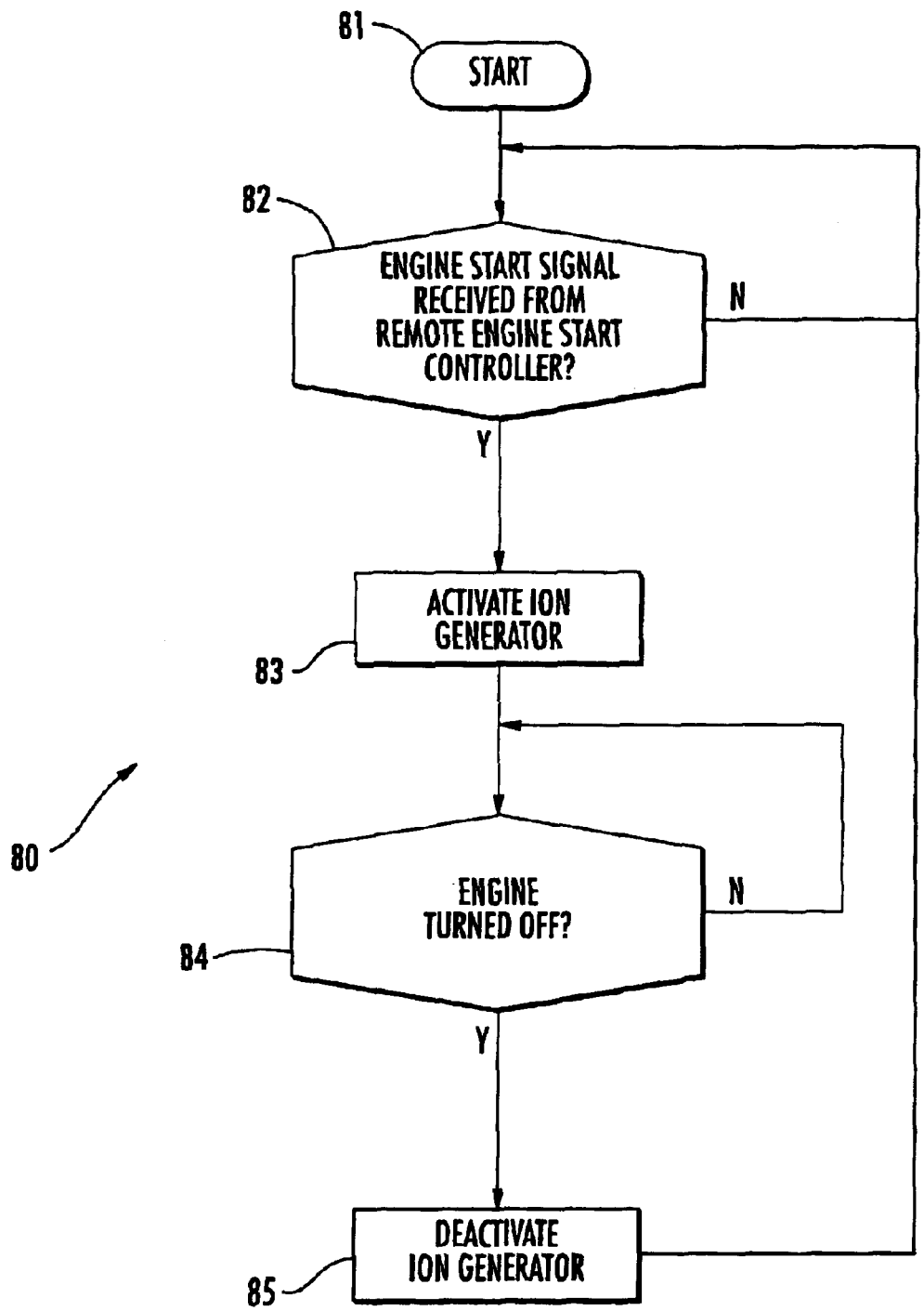

Turning now additionally to the flow chart 80 of FIG. 6, yet further operation of the vehicle remote control and air treatment system 10 is now described. From the start (Block 81), it is determined at Block 82 whether an engine start signal has been received from the remote engine start controller 25c. If it is determined at Block 82 that an engine start signal has been received from the remote engine start controller 25c, then the electrically powered ion generator 15 is activated at Block 83. If, however, it is determined at Block 82 that the engine start signal has not been received from the remote engine start controller 25c, then the system 10 awaits receipt of the remote engine start signal.

At Block 84, it is determined whether the engine has been turned off. If it is determined that the engine has been turned off, then the electrically powered ion generator 15 is deactivated at Block 85. If, however, it is determined that then engine has not been turned off, then the system 10 awaits the engine to be turned off. After the electrically powered ion generator 15 is deactivated at Block 85, the system 10 again awaits the engine start signal from the remote engine start controller 25c. Accordingly, user convenience and battery conservation are also provided.

Although an ion generator 15 has been described in the preferred embodiment description above, in yet other preferred embodiments an air treatment device, such as a filter, may also be used as will be appreciated by those skilled in the art. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

What is claimed is:

1. A vehicle remote control and air treatment system comprising:
    an electrically powered ion generator for selectively generating ions in the vehicle;
    at least one remote transmitter;
    a receiver at the vehicle for receiving signals from said at least one remote transmitter; and
    a controller at the vehicle and connected to said receiver for performing at least one vehicle function based upon signals from said at least one remote transmitter;
    said controller also selectively operating said electrically powered ion generator.

2. A vehicle remote control and air treatment system according to claim 1 wherein said controller comprises a security controller switchable to different modes; and wherein said security controller selectively operates said electrically powered ion generator based upon the mode.

3. A vehicle remote control and air treatment system according to claim 2 wherein said security controller is switchable between armed and disarmed modes; and wherein said security controller selectively turns said electrically powered ion generator on when said security controller is in the disarmed mode and turns said electrically powered ion generator off when said security controller is in the armed mode.

4. A vehicle remote control and air treatment system according to claim 1 wherein said electrically powered ion generator comprises:
    a power supply for generating a voltage from a vehicle supply voltage; and
    an electrode structure connected to said power supply.

5. A vehicle remote control and air treatment system according to claim 4 wherein said electrode structure comprises a conductive brush.

6. A vehicle remote control and air treatment system according to claim 4 wherein said electrically powered ion generator further comprises a housing separate from said controller; and wherein said housing carries said power supply and said electrode structure.

7. A vehicle remote control and air treatment system according to claim 6 wherein said receiver is also carried by said housing.

8. A vehicle remote control and air treatment system according to claim 6 further comprising an antenna carried by said housing.

9. A vehicle remote control and air treatment system according to claim 6 further comprising at least one of a control switch and an indicator connected to said controller and carried by said housing.

10. A vehicle remote control and air treatment system according to claim 1 wherein said controller comprises a remote keyless entry controller.

11. A vehicle remote control and air treatment system according to claim 10 wherein said remote keyless entry controller operates said electrically powered ion generator responsive to a signal to unlock at least one vehicle door.

12. A vehicle remote control and air treatment system according to claim 1 wherein said controller comprises a remote engine start controller.

13. A vehicle remote control and air treatment system according to claim 10 wherein said remote engine start controller operates said electrically powered ion generator responsive to a signal to start an engine of the vehicle.

14. A vehicle remote control and air treatment system according to claim 1 further comprising a manual switch for selectively operating said electrically powered ion generator.

15. A vehicle remote control and air treatment system according to claim 1 wherein said electrically powered ion generator comprises at least one indicator for indicating operation of said electrically powered ion generator.

16. A vehicle security and air treatment system comprising:
   an electrically powered ion generator for selectively generating ions in the vehicle;
   at least one remote transmitter;
   a receiver at the vehicle for receiving signals from said at least one remote transmitter; and
   a security controller at the vehicle connected to said receiver and switchable between armed and disarmed modes based upon signals from said at least one remote transmitter;
   said security controller selectively turning said electrically powered ion generator on when said security controller is in the disarmed mode and turning said electrically powered ion generator off when said security controller is in the armed mode.

17. A vehicle security and air treatment system according to claim 16 wherein said electrically powered ion generator comprises:
   a power supply for generating a voltage from a vehicle supply voltage; and
   an electrode structure connected to said power supply.

18. A vehicle security and air treatment system according to claim 17 wherein said electrically powered ion generator further comprises a housing separate from said security controller; and wherein said housing carries said power supply and electrode structure.

19. A vehicle security and air treatment system according to claim 17 wherein said receiver is also carried by said housing.

20. A vehicle security and air treatment system according to claim 17 further comprising an antenna carried by said housing.

21. A vehicle security and air treatment system according to claim 17 further comprising at least one of a control switch and an indicator connected to said security controller and carried by said housing.

22. A vehicle security and air treatment system according to claim 16 further comprising a manual switch for selectively operating said electrically powered ion generator.

23. A vehicle remote control and air treatment system comprising:
   an electrically powered ion generator for selectively generating ions in the vehicle;
   at least one remote transmitter;
   a controller at the vehicle for performing at least one vehicle function based upon signals from said at least one remote transmitter;
   said electrically powered ion generator comprising
      a housing separate from said controller,
      a power supply carried by said housing for generating a voltage from a vehicle supply voltage, and
      an electrode structure connected to said power supply and carried by said housing; and
   at least one controller device also carried by said housing and connected to said controller.

24. A vehicle remote control and air treatment system according to claim 23 wherein said at least one controller device comprises a receiver for receiving signals from said at least one remote transmitter.

25. A vehicle remote control and air treatment system according to claim 23 wherein said at least one controller device comprises an antenna.

26. A vehicle remote control and air treatment system according to claim 23 wherein said at least one controller device comprises at least one of a control switch and an indicator.

27. A vehicle remote control and air treatment system according to claim 23 wherein said electrode structure comprises a conductive brush.

28. A vehicle remote control and air treatment system according to claim 23 wherein said controller comprises at least one of a security controller, a remote keyless entry controller and a remote engine start controller.

29. A vehicle remote control and air treatment system according to claim 23 further comprising a manual switch carried by said housing for selectively operating said electrically powered ion generator.

30. A vehicle remote control and air treatment system comprising:
   an air treatment device for selectively treating air in the vehicle;
   at least one remote transmitter;
   a receiver at the vehicle for receiving signals from said at least one remote transmitter; and
   a security controller at the vehicle and connected to said receiver for performing at least one vehicle security function based upon signals from said at least one remote transmitter;
   said controller also selectively operating said air treatment device.

31. A vehicle remote control and air treatment system according to claim 30 wherein said security controller selectively operates said air treatment device based upon a mode thereof.

32. A vehicle remote control and air treatment system according to claim 30 wherein said security controller is switchable between armed and disarmed modes; and wherein said security controller selectively turns said air treatment device on when said security controller is in the disarmed mode and turns said air treatment device off when said security controller is in the armed mode.

33. A vehicle remote control and air treatment system according to claim 30 wherein said air treatment device comprises an electrically powered ion generator.

34. A vehicle remote control and air treatment system comprising:
   an electrically powered ion generator for selectively generating ions in the vehicle;
   at least one remote transmitter;
   a receiver at the vehicle for receiving signals from said at least one remote transmitter; and
   a remote keyless entry controller at the vehicle and connected to said receiver for selectively operating said electrically powered ion generator.

35. A vehicle remote control and air treatment system according to claim 34 wherein said remote keyless entry controller operates said electrically powered ion generator responsive to a signal to unlock at least one vehicle door.

36. A method for treating air within a vehicle comprising:

providing an electrically powered ion generator in the vehicle; and selectively operating the electrically powered ion generator using a controller at the vehicle that is also for performing at least one vehicle function based upon signals from at least one remote transmitter.

37. A method according to claim 36 wherein the controller comprises a security controller switchable to different modes; and wherein selectively operating the electrically powered ion generator further comprises selectively operating the electrically powered ion generator based upon the mode of the security controller.

38. A method according to claim 37 wherein the security controller is switchable between armed and disarmed modes; and further comprising turning the electrically powered ion generator on when the security controller is in the disarmed mode and turning the electrically powered ion generator off when the security controller is in the armed mode.

39. A method according to claim 36 wherein the electrically powered ion generator comprises:

a power supply for generating a voltage from a vehicle supply voltage; and an electrode structure connected to the power supply.

40. A method according to claim 36 wherein the controller comprises a remote keyless entry controller; and further comprising selectively operating the electrically powered ion generator responsive to a signal to unlock at least one vehicle door.

41. A method according to claim 36 wherein the controller comprises a remote engine start controller; and further comprising operating the electrically powered ion generator responsive to a signal to start an engine of the vehicle.

42. A method according to claim 36 further comprising manually operating the electrically powered ion generator.

* * * * *

UNITED STATES PATENT AND TRADEMARK OFFICE
CERTIFICATE OF CORRECTION

PATENT NO. : 6,827,642 B2
DATED : December 7, 2004
INVENTOR(S) : Flick

It is certified that error appears in the above-identified patent and that said Letters Patent is hereby corrected as shown below:

Column 1,
Line 55, delete "from same" insert -- from the same --

Column 5,
Line 15, delete "of of" insert -- of --
Line 27, delete "received the" insert -- received from the --
Line 53, delete "that then" insert -- that the --

Signed and Sealed this

Seventeenth Day of May, 2005

JON W. DUDAS
*Director of the United States Patent and Trademark Office*